United States Patent
Luque et al.

(10) Patent No.: US 6,467,977 B2
(45) Date of Patent: *Oct. 22, 2002

(54) MEDIA WEIGHT SENSOR USING A RESONANT PIEZOELECTRIC ELEMENT

(75) Inventors: Phillip R. Luque, Boise, ID (US); Jeffrey S. Weaver, Ft. Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 09/746,638

(22) Filed: Dec. 19, 2000

(65) Prior Publication Data

US 2002/0076253 A1 Jun. 20, 2002

(51) Int. Cl.[7] ............................ B41J 11/20; B41J 13/02; B41J 11/58
(52) U.S. Cl. ............................ 400/56; 400/636; 400/624
(58) Field of Search ........................... 400/56, 624, 156, 400/636.3; 101/636.3; 73/54.24; 324/58.5

(56) References Cited

U.S. PATENT DOCUMENTS

| | | | |
|---|---|---|---|
| 4,581,575 A | * 4/1986 | Osaki et al. | 324/58.5 |
| 4,712,037 A | * 12/1987 | Verbeek et al. | 310/323 |
| 4,848,944 A | * 7/1989 | Fuller et al. | 400/624 |
| 4,890,054 A | * 12/1989 | Maeno et al. | 324/58.5 |
| 4,908,508 A | 3/1990 | Dubbeldam | 250/225 |
| 5,099,118 A | 3/1992 | Francis | 250/308 |
| 5,127,643 A | 7/1992 | DeSanctis et al. | 271/9 |
| 5,138,178 A | 8/1992 | Wong et al. | 250/559 |
| 5,195,430 A | * 3/1993 | Rise | 100/168 |
| 5,806,992 A | 9/1998 | Ju | 400/56 |
| 5,945,605 A | * 8/1999 | Julian et al. | 73/727 |
| 5,962,861 A | 10/1999 | Fowler | 250/559.27 |
| 6,028,318 A | 2/2000 | Cornelius | 250/559.27 |
| 6,269,686 B1 | * 8/2001 | Hahn et al. | 73/54.24 |

* cited by examiner

Primary Examiner—Leslie J. Evanisko
Assistant Examiner—Marvin P. Crenshaw
(74) Attorney, Agent, or Firm—James R. McDaniel

(57) ABSTRACT

This invention relates to a media weight sensor of the type that includes a transducer consisting of a metal disk with a piezoelectric element mounted in a printer so that the media going to the printer moves across the top of the resonator where an opening of the resonator is located. A soft, polymeric roller is used to press the media against the transducer. The resonant frequency of the resonator is affected by the media. The mass of the media adds to the mass of the resonator, thereby lowering the resonant frequency. Consequently, the heavier the media, the more the resonant frequency is lowered.

12 Claims, 3 Drawing Sheets

MEDIA WEIGHT SENSOR USING A RESONANT PIEZOELECTRIC ELEMENT

FIELD OF THE INVENTION

This invention relates to a media weight sensor of the type that includes a transducer consisting of a metal disk with a piezoelectric element mounted in a printer so that the media going to the printer moves across the top of the resonator where an opening where the resonator is located. A soft, polymeric roller may be used to press the media against the transducer. The resonant frequency of the resonator is affected by the media. The mass of the media adds to the mass of the resonator, thereby lowering the resonant frequency. Consequently, the heavier the media, the more the resonant frequency is lowered.

DESCRIPTION OF THE RELATED ART

It is known, in paperweight sensors, to employ optical sensors. Exemplary of such prior art is U.S. Pat. No. 5,138,178 ('178) to L. F. Wong et. al., entitled "Photoelectric Paper Basis Weight Sensor" and U.S. Pat. No. 5,127,643 ('643) to A. T. DeSanctis et. al., entitled "Automatic Copy Sheet Selection Device." While the '178 and '643 references employ optical sensors, these sensors are used to measure thickness or weight of the paper. These measurements are accomplished by measuring the amount of light that passes through the paper. However, if the paper is coated, this coating can adversely affect how much light passes through the paper. Consequently, an accurate measurement may not be obtained.

It is also known, in paperweight sensors, to measure the stiffness of the paper in order to determine the weight of the paper. Exemplary of such prior art is commonly assigned U.S. Pat. No. 5,962,861 ('861) to P. Fowler, entitled "Sheet Media Weight Detector and Method" and commonly assigned U.S. Pat. No. 6,028,318 ('318) to W. L. Cornelius, entitled "Print Media Weight Detection System." While the '861 and '318 references measure the stiffness of the paper in order to ascertain the weight of the paper, these do not employ a resonator. Instead, these references measure the deflection of the paper that is related to the stiffness and, thereby the weight of the paper.

Finally, it is known, in paperweight sensors, to measure paper thickness. Exemplary of such prior art is U.S. Pat. No. 5,806,992 ('992) to Y. Ju, entitled "Sheet Thickness Sensing Technique and Recording Head Automatic Adjusting Technique of Ink Jet Recording Apparatus Using Same." While the '992 reference measures sheet thickness, it does so by measuring the amount of arm rotation, which can result in a complex and fragile assembly. While the apparatus of the '992 reference may be able to accurately measure the thickness of the sheet of paper, in order to determine the weight of the paper, assumptions must be made as to the makeup of the sheet of paper. For example, it must be assumed that each sheet of paper has the same density. However, it is well known that the density of sheets of paper in the same stack of paper can vary by as much as a factor of two. Consequently, a weight determination cannot be accurately made.

It is apparent from the above that there exists a need in the art for a media weight sensor system which is lightweight through simplicity of parts and uniqueness of structure, and which at least equals the media weight sensing characteristics of the known media weight sensors, but which at the same time employs a resonator. It is a purpose of this invention to fulfill this and other needs in the art in a manner more apparent to the skilled artisan once given the following disclosure.

SUMMARY OF THE INVENTION

Generally speaking, this invention fulfills these needs by providing a media weight sensing apparatus, comprising a resonator means having an opening and a media weight measuring means operatively connected to the resonator means and a media traversing means for traversing a media, whose weight is to be determined, across the opening in the resonator means.

In certain preferred embodiments, the resonator includes a piezoelectric element and a metal disk. Also, the media weight measuring means includes a drive circuit operatively connected to the piezoelectric element. Finally, the media traversing means includes a compliant roller.

In another further preferred embodiment, the apparatus measures a media property that is a combination of both the media thickness and density. As a result, the measurement may more accurately reflect the media weight by measuring the change of the resonant frequency of the piezoelectric element with and without the media. Since it is a differencing measurement, it will be relatively insensitive to factors, such as wear and temperature.

The preferred sensing apparatus, according to this invention, offers the following advantages: lightness in weight; ease of assembly and repair; excellent weight measurement characteristics; good stability; excellent durability; and good economy. In fact, in many of the preferred embodiments, these factors of lightness in weight, ease of assembly and repair, weight measurement characteristics, and durability are optimized to an extent that is considerably higher than heretofore achieved in prior, known media weight sensing apparatus.

The above and other features of the present invention, which will become more apparent as a description proceeds, are best understood by considering the following detailed description in conjunction with the accompanying drawings, wherein like characters represent like parts throughout the several views and in which:

DETAILED DESCRIPTION OF THE INVENTION

Figure 1:
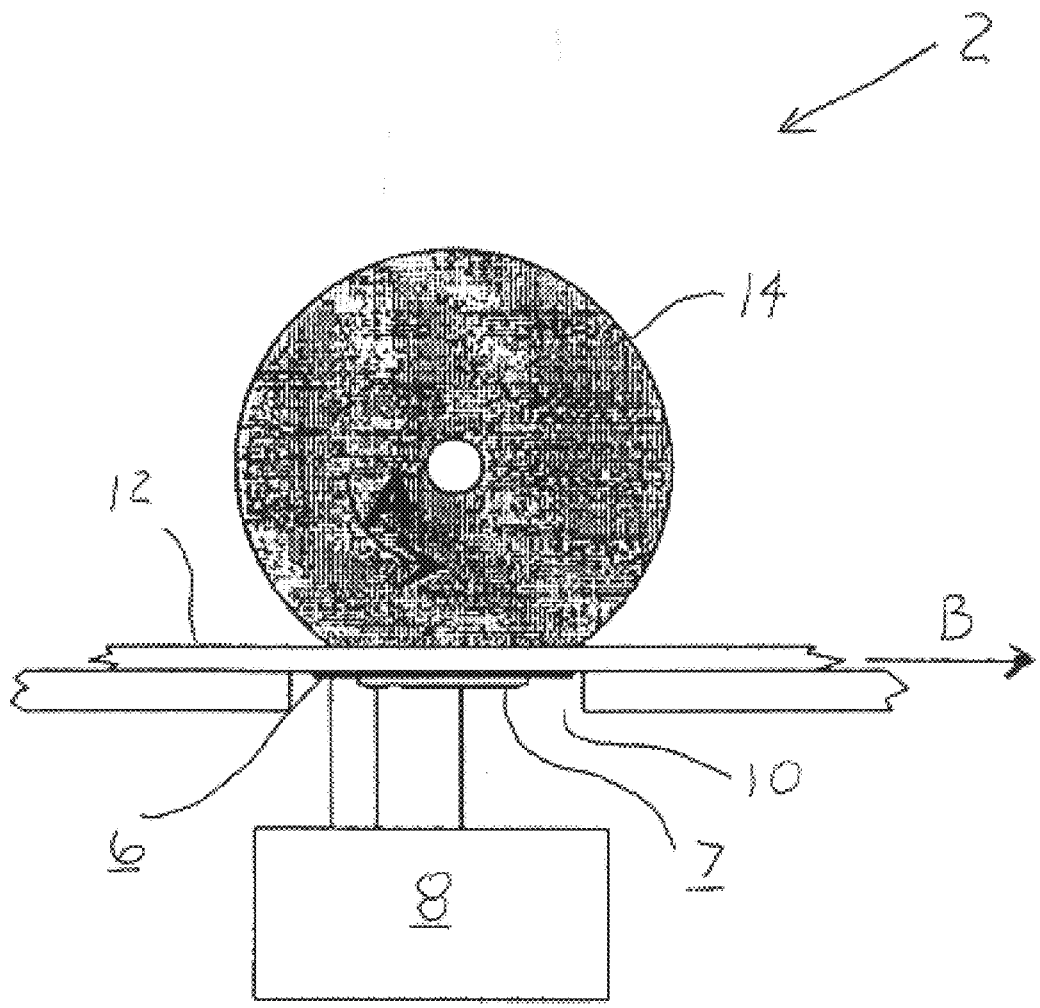
FIG. 1 is a schematic illustration of a media weight sensing apparatus, according to one embodiment of the present invention.

With reference first to FIG. 1, there is illustrated one preferred embodiment for use of the concepts of this invention. In particular, media weight sensing apparatus 2 is illustrated. Apparatus 2 includes, in part, disk 6, piezoelectric element 7, drive circuit 8, opening 10, conventional media 12, and compliant roller 14.

Figure 2:
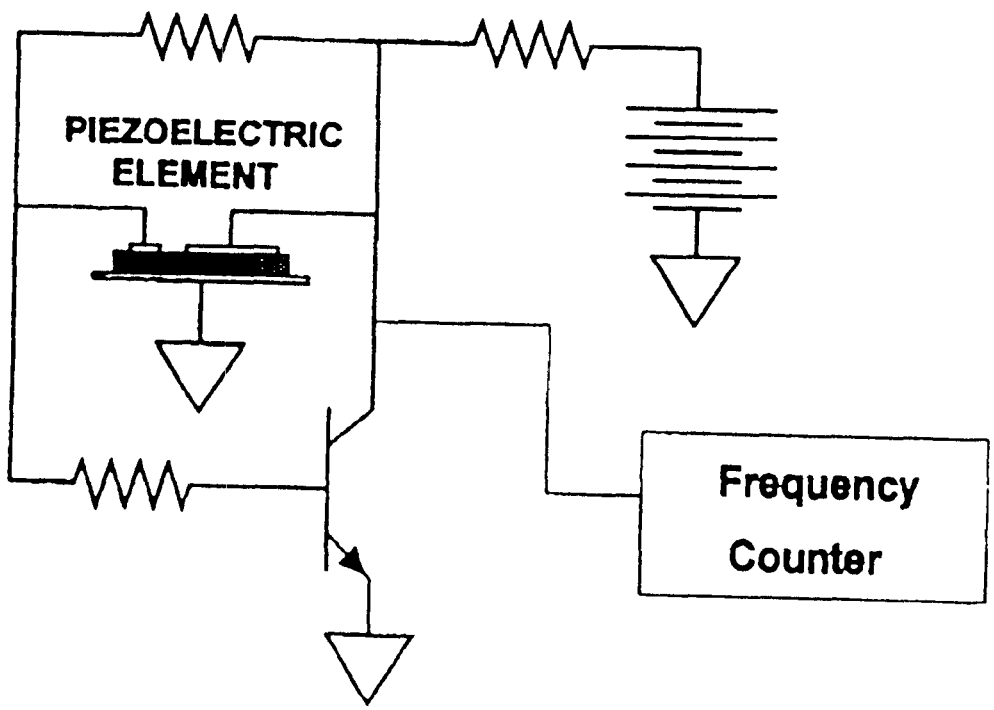
FIG. 2 is a schematic illustration of a drive circuit for the media weight sensing apparatus, according to the present invention.

Disk 6 is conventionally mounted in opening 10. Disk 6 is, preferably, constructed of any suitable, metallic material and is conventionally attached to piezoelectric element 7. Piezoelectric element 7 is conventionally attached to drive circuit 8. Drive circuit 8 is illustrated in FIG. 2. Piezoelectric element 7, disk 6, and opening 10 make up a resonator. Piezoelectric element 7 and disk 6 make up a transducer that is used to measure resonant frequency. Media 12 can be, but is not limited to, paper, paperboard, plastic, cloth or the like. Roller 14, preferably, is constructed of any suitable soft, polymeric material. It is to be understood that roller 14 may be replaced with any type of traversing device that is capable of moving media 12 past opening 10 while keeping media 12 in contact with opening 10.

As discussed above, disk 6 is attached to piezoelectric element 7 on one side, thereby forming the back of a resonator. Preferably, this resonator can be mounted in a printer. Media 12 moves across opening 10 in the direction of arrow B by the rotation of roller 14 along the direction of arrow A. Not only does roller 14 traverse media 12 along the direction of arrow B, but also it is used to press media 12 against opening 10. The resonant frequency of the resonator is affected by media 12.

The heavier the media 12, the more the resonant frequency is lowered. Drive circuit 8 (FIG. 2) is used to oscillate apparatus 2 at the resonant frequency of the apparatus 2-media 12 combination. By measuring the drop in the oscillator frequency caused by media 12, the "weight" of media 12 can be accurately estimated, as shown in FIG. 3.

During the operation of apparatus 2, a resonant frequency is conventionally obtained from apparatus 2 without any media 12 being located over opening 10. A sample of media 12 is then placed over opening 10 by roller 14 by conventional techniques. A resonant frequency of apparatus 2 is conventionally obtained. The resonant frequency, based upon media 12 being located over opening 10, is compared with the resonant frequency of no media 12 being located over opening 10 to obtain a net or drop in resonant frequency, such as that shown in FIG. 3. The operator merely looks to a chart similar to the one in FIG. 3 to determine the weight of media 12. It is to be understood that charts similar to FIG. 3 can be conventionally inputted into a conventional computing device (not shown) and an automatic media weight read out can be obtained from the computing device.

Figure 3:
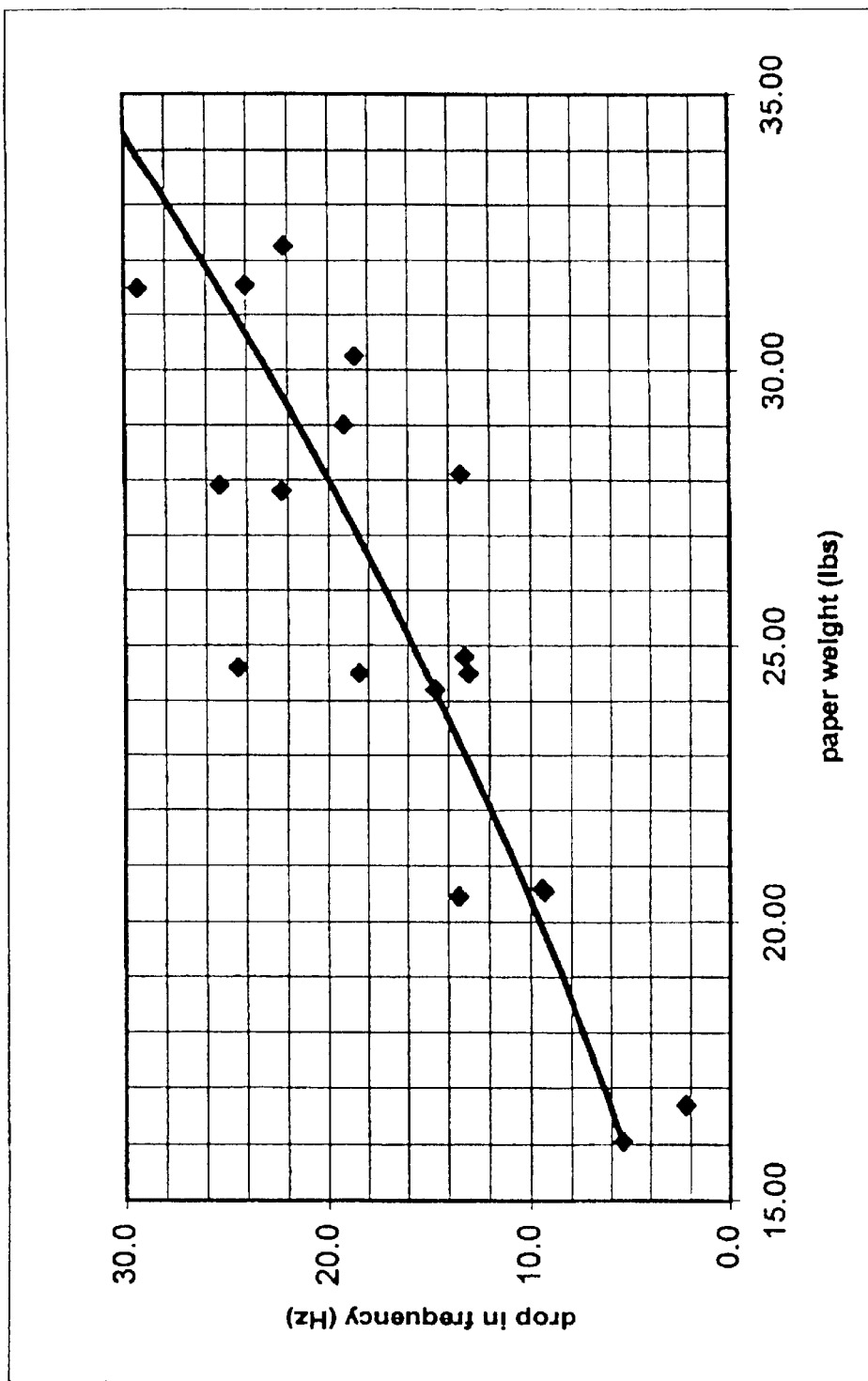
FIG. 3 is a graphical illustration of drop in frequency (in Hertz) vs. paperweight (in pounds).

With respect to FIG. 3, the efficacy of the present invention is illustrated. In this example, the various weights of paper samples were determined based upon net or drop in resonant frequency levels. As can be seen in FIG. 3, one merely has to obtain the net or drop in resonant frequency level in order to determine the weight of the paper media. For example, if a net or drop in resonant frequency of 20 Hertz was shown by apparatus 2 on a conventional display device (not shown), one would ascertain that the paper media had a paperweight of approximately 28 pounds.

It is to be understood that apparatus 2 can be employed in a printer. For example, as media 12 is getting ready to be printed by the printer, media 12 is moved across opening 10 of apparatus 2 located within a housing (not shown) of the printer, as described above. In this manner, the weight of media 12 can be determined prior to printing. This weight determination will allow the printer to make conventional adjustments based on the weight of media 12. For example, if it is determined that media 12 is heavier than the media just printed on, the printer can increase the strength of the impact, if the printer is a dot matrix printer. Also, if the printer is an electrophotographic printer, the weight of media 12 can affect the paper speed through the fuser and/or the fuser temperature.

As can be seen, the present invention measures a property that is a combination of both the thickness of media 12 and the density of media 12. As a result, the measurement should more accurately reflect the weight of media 12, than a thickness-only measurement. Also, the present invention is inherently less expensive, more efficient, and more reliable than the thickness sensors. This is because piezoelectric element 6 is much less expensive than inductive sensors. Also, the present invention makes its measurement without touching the paper and is not subject to wear as is a thickness sensor that must touch the moving media. Finally, the present invention makes its measurement by measuring the change of the resonant frequency of piezoelectric element 6 with and without media 12. Since it is a differencing measurement, it will be relatively insensitive to factors, such as wear and temperature.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A media weight sensing apparatus, comprising:
   a resonator means having an opening and a media weight measuring means operatively connected said resonator means, wherein said resonator means is further comprised of; a piezoelectric means operatively connected to said resonator housing; and a disk means operatively connected to said piezoelectric means; and
   a media traversing means for traversing the media, whose weight is to be determined, across said opening in said resonator means.

2. The apparatus, as in claim 1, wherein said media weight measuring means is further comprised of:
   a drive means.

3. The apparatus, as in claim 1, wherein said piezoelectric means is further comprised of:
   a piezoelectric element.

4. The apparatus, as in claim 1, wherein said disk means is further comprised of:
   a metallic desk.

5. The apparatus, as in claim 1, wherein said media traversing means is further comprised of:
   a compliant roller.

6. The apparatus, as in claim 5, wherein said compliant roller is further comprised of:
   a soft, polymeric roller.

7. A printer, wherein said printer is capable of sensing a media weight, comprising:
   a printer housing;
   a resonator means having an opening and located substantially within said printer housing, wherein said resonator means is further comprised of; a piezoelectric means operatively connected to said resonator housing, and a disk means operatively connected to said piezoelectric means;
   a media weight measuring means operatively connected to said resonator means; and
   a media traversing means for traversing a media, whose weight is to be determined, across said opening in said resonator means.

8. The printer, as in claim 7, wherein said media weight measuring means is further comprised of:
   a drive means.

9. The printer, as in claim 7, wherein said piezoelectric means is further comprised of:
   a piezoelectric element.

10. The printer, as in claim 7, wherein said disk means is further comprised of:

a metallic disk.

11. The printer, as in claim 7, wherein said media traversing means is further comprised of:

a compliant roller.

12. The printer, as in claim 11, wherein said compliant roller is further comprised of:

a soft, polymeric roller.

* * * * *

UNITED STATES PATENT AND TRADEMARK OFFICE
CERTIFICATE OF CORRECTION

PATENT NO.   : 6,467,977 B2
DATED        : October 22, 2002
INVENTOR(S)  : Phillip R. Luque et al.

It is certified that error appears in the above-identified patent and that said Letters Patent is hereby corrected as shown below:

<u>Column 4,</u>
Line 40, delete "desk." and insert therefor -- disk. --

Signed and Sealed this

Twenty-sixth Day of July, 2005

JON W. DUDAS
*Director of the United States Patent and Trademark Office*